3,086,909
Patented Apr. 23, 1963

3,086,909
THERAPEUTIC COMPOSITION OF LITHOSPERMIUM ERYTHRORHIZON IN JAPAN WAX AND SESAME OIL
Kinzo Otsuki and Junzo Otsuki, both of 18 Kami-Koya, Fukuchiyama, Kyoto, Japan
No Drawing. Filed Sept. 28, 1960, Ser. No. 58,884
4 Claims. (Cl. 167—58)

This invention relates, in one aspect thereof, to a process for extracting the active component of *Lithospermum erythrorhizon*. It is well known that the coloring matter and active component of *Lithospermum erythrorhizon* are extracted by benzene. The use of solvents of this kind is attended with danger of causing explosion or fire during the operation and requires a special apparatus. Such a method, therefore, can not be regarded as an economical, effective and safe one. In addition, solvents of this kind are poorly recovered because of their ready volatility, especially in summer time. Although the active component of *Lithospermum erythrorhizon* is extracted by an alkaline aqueous solvent, the extraction in this case is inefficient and takes a long time, as compared with the case of an organic solvent.

The present invention relates to a process for extracting the active component of *Lithospermum erythrorhizon*, which has no such shortcomings as mentioned above. This invention is based on findings that the active component of *Lithospermum erythrorhizon* can be efficiently extracted by such chlorinated hydrocarbons as are nearly or entirely incombustible and are heavier than water, that in this case the presence of water does not affect the extraction, that the extracted active component can be transferred into an alkaline aqueous solvent, and that the remaining organic solvent can be used repeatedly for further extraction as it is.

That is to say, the process of this invention is effected as follows: *Lithospermum erythrorhizon* is immersed in a chlorinated hydrocarbon which is nearly or entirely incombustible and is heavier than water, and water is layered on the organic solvent. After extraction, the water layer is made alkaline with alkali hydroxide to transfer the active component in the organic solvent into the aqueous layer, the aqueous solution is then separated, and the organic solvent, after being made acid if necessary, is used for further extraction as above.

Whole plants or any parts of *Lithospermum erythrorhizon* can be employed as the material of this process, but they are generally used as fine pieces. As the nearly or entirely incombustible solvent there are used, for example, carbon tetrachloride, chloroform, trichlorethylene, etc. In general, the amount of the chlorinated hydrocarbon to be used is several times that of the plant material. The water layer on the organic solvent should be sufficient to cover the latter during the operation; therefore, its amount is decided taking into account the whirl-pool caused by stirring or other phenomena during the operation. The extraction may be conducted at room temperature (20–30° C.) or at a slightly higher temperature. But such a higher temperature as causes the organic solvent or water to boil should be avoided. Since the active component of *Lithospermum erythrorhizon* is unstable to heat, the extraction is effected preferably at a temperature lower than room temperature.

Commercial carbon tetrachloride is usually a little acid and, therefore, has the advantage of being able to be used for the extraction without the addition of an acid.

After the extraction the water layer is made alkaline with alkali hydroxide, and the active component in the organic solvent is transferred into the aqueous layer by stirring. Alkalinity of about 0.5 N is enough for the purpose. The alkaline aqueous layer is then separated and the organic solvent is acidified and used for further extraction as before. Several repetitions of such operation extract the active component almost exhaustively. Mineral acids such as hydrochloric, sulfuric and phosphoric acids are suitable to make the organic solvent acid.

Since this invention makes it possible to use nearly or entirely incombustible organic solvents for the extraction, there is no danger of fire during the operation, consequently a simple apparatus is available. In addition, since the organic solvent is covered with water throughout the operation, the loss of former due to its volatilization remains at a minimum. In summer time the volatility of the solvent is conveniently lowered by throwing ice into the water layer.

It is the inventors' new finding that chlorinated hydrocarbon is a good solvent for extraction of the active component of *Lithospermum erythrorhizon*. It might be expected that in the process of this invention diffusion of water particles in the organic solvent would lower the efficiency of the extraction, but in actuality it does not. According to the present process extraction by the organic solvent and transference of the extracted active component into the aqueous solvent is effected in the same vessel; therefore, this process requires a simple apparatus and is time-saving, as compared with the case in which the two operations are conducted in different vessels.

In the traditional method the organic solvent used is recovered by distillation, but the present process requires no such operation and, therefore, avoids the loss owing to distillation.

The bulk of the active component in the aqueous solvent is precipitated by the addition of a suitable amount of acid such as hydrochloric acid and the precipitate is separated by centrifugation or by filtration. The active component still remaining in the aqueous solvent is extracted with an organic solvent such as ether and the ethereal extract is evaporated. In order to obtain a homogeneous extract of the active component the abovementioned precipitate is dissolved in the ethereal extract and the solution is evaporated.

The active component of *Lithospermum erythrorhizon* thus obtained is dark reddish extract and is used for medical purposes as it is.

*Example 1*

Finely cut *Lithospermum erythrorhizon* is immersed in for times its weight of carbon tetrachloride for a short time in a extracting vessel, then two time its weight of water is layered on the solvent, and the extraction is started by stirring at room temperature. After extraction the water layer is made alkaline to 0.5 N with sodium hydroxide solution, and the active componet in the organic solvent is transferred into the aqueous layer with stirring. The aqueous solution is separated and the same weight of water as that of the plant is layered again on the remaining organic solvent. Hydrochloric acid is added until the organic solvent is colored red and the extraction is continued as above. If necessary, the same operation is repeated.

To the aqueous solution of the active component is added hydrochloric acid with stirring until the solution is colored red and the resulting precipitation is separated by centrifugation or by filtration. The filtrate is extracted with ether, the above precipitate is dissolved in the ethereal extract, and the solution is evaporated to obtain the desired product.

*Example 2*

The procedure according to Example 1 is repeated, except that the carbon tetrachloride is replaced by chloroform.

In a second aspect thereof, the present invention is concerned with the embodiment of a new ointment for the therapeutic application of the active component of *Lithospermum erythrorhizon* as obtained as precedingly described.

The said ointment may, according to this aspect of the invention, be prepared as follows:

A mixture comprising Japan wax (a fat pressed out from *Rhus succendanea* Linné) and sesame oil (an oil pressed out from *Sesamum indicum* Linné) is gradually heated up to about 200° C. in the course of 30 minutes, and the mixture is then held at this temperature for 30 minutes. The next step is that the temperature of the mixture is raised quickly to about 300° C., then is lowered to about 100° C. The temperature drop should be regulated at a rate of 50° C. in every 30 minutes. Up to this step, the mixture is agitated continuously and the vessel is kept in a stream of an inert gas e.g. nitrogen and carbon dioxide to avoid oxidation of the component, ignition of the mixture, etc.

Then the melted mixture is filtered through a layer of glass-wool while the temperature is lowered to about 70° C., and a surface active agent warmed at about 70° C. is added in a portion of 2.5% by weight to the mixture. The temperature of the mixture is then lowered to about 50° C. (after incorporating any desired additaments, such as antalgics, sterilizers, etc.) and the extract of *Lithospermum erythrorhizon* obtained by the present invention is added thereto.

The mixture is again warmed to about 70° C. to evaporate any organic solvent comprised in the extract, and the mixture is cooled to ambient temperature quickly to obtain the objective ointment. All the treatments from the starting material to he product are conducted under agitation.

The aforesaid initial mixture is constituted by 20% by weight of Japan wax and 80% by weight of sesame oil. The surface active agent is a polyoxyethylene glycol mono-higher fatty acid ester being, for instance, polyoxyethylene glycol monolaurate, polyoxyethlene glycol monostearate and polyoxyethylene glycol mono-oleate. Or, the surface active agent may be polyoxyethylene higher alkyl ether (e.g. lauryl (oleyl and cetyl ether), sorbitan mono- or di-higher fatty acid ester (e.g. laurate, and palmitate), polyoxyethylene sorbitan higher fatty acid ester (e.g. laurate, stearate and oleate), etc.

The characteristic properties of the base ointment thus prepared are:

Acid value _____ 5.4
Saponification value _____ 186.4
Iodine value _____ 95.2
Unsaponifiable matter _____ percent_ 2.56
Melting range _____° C__ 38–41

While reference has been made above to a mixture of 20% by weight of Japan wax and 80% by weight of sesame oil, the mixture components may vary between 15% by weight of the former and 85% by weight of the latter and 75% by weight of the former and 25% by weight of the latter. The composition may suitably be determined in accordance with the desired hardness of the ointment to be prepared.

The ointment thus obtained is superior to prior known ointments in the following points. Comparison was made between the present ointment (I) and the ointment of the extract of *Lithospermum erythrorhizon* produced by using Japan wax ointment (Japanese Pharmacopoeia Ed. V) (II). (Other bases of ointment using mineral, vegetable or animal oils were found to have more or less similar shortcomings to the Japan wax ointment.)

The shortcomings of (II) are:

(1) Under the usual storage condition especially in summer time, the components (Japan wax and sesame oil) are easily separated from each other.

(2) Especially in winter, the facility to spread is easily lost and the ointment is liable to be cracked in storage for even a very short term.

(3) Under the usual storage condition, the component is liable to be acidified to generate an odor caused by the acidification.

(4) (II) has no absorptive power of serous fluid. The ointment (I) has no such shortcoming. In other words, (1) the components of (I) do not separate from each other even if it is preserved below the freezing point or over 35° C., and suitable viscosity and facility to spread as an ointment are maintained in such temperature range, (2) (I) has a good affinity with the affected part on the skin, and absorbs a secretion from the wound; (3) (I) is subject to essentially no acidification and thus to no odor generation caused by the acidification; and (4) the active ingredients in the extract belonging to naphthoquinone series are kept stable and the medicinal effect thereof is amplified.

An ointment containing *Lithospermum erythrorhizon* extract using Japan wax ointment (Japanese Pharmacopoeia V) as its base is not easily applied to wounds, burns, chilblains, etc. But the ointment of the present invention has no such shortcoming. Therefore, use of the ointment base of the present invention instead of Japan wax ointment has enabled *Lithospermum erythrorhizon* extract to be applicable to a broader scope of injuries than ever before.

As the antalgic to be comprised in the ointment of this invention there may be used e.g. ethyl p-aminobenzoate, p-aminobenzoyl-diethylaminoethanol hydrochloride, and as the sterilizer to be comprised in the ointment, there may be used e.g. sulfonamide drugs such as p-aminomethylbenzene sulfonamide hydrochloride and p-aminobenzene sulfonamide, cationic detergent. As the surface active agent, fatty acid esters of polyethyleneglycol are preferable as aforesaid; however, other surfactants may be used. Both the Japan wax and sesame oil may be carefully purified to make the quality of the product finer, but of course these materials may be used in a considerably impure state so long as prejudicial components are eliminated. If it is not desirable to add an antalgic and/or a sterilizer, of course they need not be added to the ointment, and such a drug as vitamin A and vitamin D may be added to supplement the activity of the ointment.

Prior known processes for producing various ointments involve mixing two or more components at a temperature of about the melting point of the components which is not higher than around 100° C. For example "white ointment" of Japanese Pharmacopoeia VI or U.S. Pharmacopoeia XIV, "simple ointment" of Japanese Pharmacopoeia VI or British pharmacopoeia 1948, etc. are generally produced on a water bath; therefore the temperature must be under 100° C. And it is common knowledge when an ointment is produced that the temperature must not be raised too high, e.g. to nearly the ignition points (about 305° C.) of the components, so as to avoid increasing of the acidity of the product caused from undesirable decomposition and polymerization of the components. As the melting point of Japan wax is about 48–54° C. (Japanese Pharmacopoeia VI) and sesame oil is liquid at a room temperature, it can be said that a temperature less than 100° C. is necessary and sufficient for producing an ointment composed of the two components. On the other hand, the ointment of this invention having particular effects, can be successfully prepared using such severe conditions as have been heretofore been regarded as undesirable. Thus it can be said that the present method for producing ointments is very remarkable and brings unforseeable results.

Typical therapeutically useful preparations according to this invention are set forth in the following examples. In these examples, percentages are by weight, the term "extract" refers to the extract of *Lithospermum erythrorhizon* obtained according to the present invention, and the term "ointment base" refers to the ointment base prepared according to this invention as hereinbefore described.

Example 3

An ointment which is admirably suited for the treatment of burns (scalds and the like), lacerated hemorrhoidal wounds, wounds resulting from resection of anal fistula, hemorrhoidectomy wounds, eczema, impetigo, skin infections, etc., has the following composition:

|  | Percent |
|---|---|
| Ethyl p-aminobenzoate | 0.5 |
| Extract | 1.0 |
| Ointment base | 98.5 |

Example 4

A therapeutically useful ointment may be prepared by admixing the following ingredients:

|  | Percent |
|---|---|
| Benzalkonium chloride (U.S.P.) | 0.1 |
| Eethyl p-aminobenzoate | 0.5 |
| Extract | 1.0 |
| Ointment base | 98.4 |

Example 5

An ointment is prepared from the following ingredients:

|  | Percent |
|---|---|
| p-Aminobenzenesulfonamide hydrochloride | 3.0 |
| Ethyl p-aminobenzoate | 0.3 |
| o-Toluene azonaphthol | 0.005 |
| Extract | 0.3 |
| Ointment base | 96.395 |

Example 6

An ointment is prepared from the following ingredients:

|  | Percent |
|---|---|
| Ethyl p-aminobenzoate | 0.5 |
| Extract | 3.0 |
| Ointment base | 96.5 |

In the foregoing examples—as is seen more especially by a comparison of Examples 3 and 6—the concentration of the extract may be changed, if desired. It is preferred, however, not to include more than 3.0% of such extract in the ointment compositions; the range from 0.3 to 3% is best adapted to the uses set forth more particularly in Example 1. All the preparations of the examples are similarly therapeutically useful.

A third aspect of the invention involves the use of the new ointment base—which has been found to be superior to prior ointment bases, such for example as Japan wax ointment base—in connection with other active ingredients than the extract according to the present invention. Thus, where the sole object in view is the topical administration of vitamins, the following composition may be employed:

Example 7

An ointment composition is prepared by incorporating into the ointment base according to the present invention 1000 international units of vitamin A and 100 international units of vitamin D.

The present application is a continuation-in-part of application Serial No. 450,266, filed August 16, 1954, now abandoned.

Having this disclosed the invention what is claimed is:

1. A therapeutically useful ointment consisting predominantly of a base constituted by a thermal blend of Japan wax and sesame oil, and containing a minor proportion of a therapeutically active ingredient, said ointment base having an acid value of 5.4, a saponification value of 186.4, an iodine value of 85.2 and a melting range of 38–41° C. and including 2.56% by weight of unsaponifiables.

2. A therapeutically useful ointment consisting predominantly of a base constituted by a thermal blend of Japan wax and sesame oil, and containing a minor proportion of the active component of *Lithospermum erythrorhizon* as a therapeutically active ingredient, said ointment base having an acid value of 5.4, a saponification value of 186.4, an iodine value of 85.2 and a melting range of 38–41° C. and including 2.56% by weight of unsaponifiables.

3. An ointment base, particularly for therapeutically useful ointments, consisting of a thermal blend of Japan wax and sesame oil, and having an acid value of 5.4, a saponification value of 186.4, an iodine value of 85.2 and a melting range of 38–41° C. and including 2.56% by weight of unsaponifiables.

4. The method of preparing an ointment base, particularly for use in therapeutic ointments, which comprises heating a mixture of Japan wax and sesame oil to about 200° C., maintaining this temperature for about 30 minutes, then successively rapidly heating the mixture to about 300° C. and cooling to about 100° C. at the rate of temperature drop of about 50° C. per half hour, the said several hereinbefore-defined steps being carried out in a non-oxidizing atmosphere, filtering the obtained blend, and then cooling the product to ambient temperature.

References Cited in the file of this patent
FOREIGN PATENTS
753,718     Great Britain     July 25, 1956

OTHER REFERENCES
Mamima: C.A., 21, 2904–5, 1927.
MacArdle: Use of Solvents, Van Nostrand Co., 1925, pp. 129–135.

UNITED STATES PATENT OFFICE
CERTIFICATE OF CORRECTION

Patent No. 3,086,909      April 23, 1963

Kinzo Otsuki et al.

It is hereby certified that error appears in the above numbered patent requiring correction and that the said Letters Patent should read as corrected below.

In the heading to the printed specification, lines 2 and 3, and in the title of invention for "LITHOSPERMIUM" read -- LITHOSPERMUM --; column 2, line 47, for "for", first occurrence, read -- four --; line 52, for "componet" read -- component --; column 3, line 42, for "lauryl (oleyl" read -- lauryl, oleyl --; column 5, line 20, for "Eethyl" read -- Ethyl --; column 6, line 11, for "this" read -- thus --.

Signed and sealed this 28th day of January 1964.

(SEAL)
Attest:
ERNEST W. SWIDER

Attesting Officer

EDWIN L. REYNOLDS

Acting Commissioner of Patents